United States Patent
Li et al.

(10) Patent No.: US 9,774,983 B2
(45) Date of Patent: Sep. 26, 2017

(54) INFORMATION PROCESSING METHOD AND METHOD FOR UE RANDOM ACCESSING LTE SYSTEM

(71) Applicant: ZTE CORPORATION, Guangdong (CN)

(72) Inventors: Xincai Li, Shenzhen (CN); Shuqiang Xia, Shenzhen (CN); Bo Dai, Shenzhen (CN); Huiying Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 425 days.

(21) Appl. No.: 14/647,192

(22) PCT Filed: Dec. 25, 2012

(86) PCT No.: PCT/CN2012/087358
§ 371 (c)(1),
(2) Date: May 26, 2015

(87) PCT Pub. No.: WO2013/107251
PCT Pub. Date: Jul. 25, 2013

(65) Prior Publication Data
US 2015/0326995 A1    Nov. 12, 2015

(30) Foreign Application Priority Data

Jan. 19, 2012    (CN) .......................... 2012 1 0017182

(51) Int. Cl.
*H04W 4/00* (2009.01)
*H04W 72/04* (2009.01)
(Continued)

(52) U.S. Cl.
CPC ......... *H04W 4/005* (2013.01); *H04W 72/042* (2013.01); *H04W 72/048* (2013.01); *H04W 74/08* (2013.01); *H04W 74/006* (2013.01)

(58) Field of Classification Search
CPC ... H04L 5/0053; H04L 5/0091; H04L 5/0094; H04L 5/0044; H04W 48/12
See application file for complete search history.

(56) References Cited

U.S. PATENT DOCUMENTS

2010/0260081 A1* 10/2010 Damnjanovic ....... H04L 5/0053
370/281

FOREIGN PATENT DOCUMENTS

CN    102202412 A     9/2011
CN    102238752 A  * 11/2011
(Continued)

OTHER PUBLICATIONS

K. S. Ko, M. J. Kim, K. Y. Bae, D. K. Sung, J. H. Kim and J. Y. Ahn, "A Novel Random Access for Fixed-Location Machine-to-Machine Communications in OFDMA Based Systems," in IEEE Communications Letters, vol. 16, No. 9, pp. 1428-1431, Sep. 2012. doi: 10.1109/LCOMM.2012.072012.120788.*
3GPP TS 36.321 V10.6.0 (Sep. 2012) Technical Specification Group Radio Access Network, Evolved Universal Terrestrial Radio Access (E-UTRA)_Medium Access Control (MAC) protocol specification_(Release 10).*
(Continued)

*Primary Examiner* — Andrew Lai
*Assistant Examiner* — Hoyet H Andrews, III
(74) *Attorney, Agent, or Firm* — Ling Wu; Stephen Yang; Ling and Yang Intellectual Property

(57) ABSTRACT

The information processing method includes: an evolved NodeB sending information of PRACH resources configured for a UE to the UE via a PDSCH indicated by a downlink control channel, and after receiving a random access preamble sequence sent from the UE, the evolved NodeB sending downlink control information and a Random Access Response (RAR), wherein the downlink control channel is an enhanced Physical Downlink Control Channel (ePDCCH); or, information carried by PBCH indicates that the downlink control channel is the ePDCCH or a physical downlink control channel; or, when the LTE system band- (Continued)

width is less than or equal to the reception bandwidth of the UE, the downlink control channel is a physical downlink control channel, and when the LTE system bandwidth is larger than the reception bandwidth of the UE, the downlink control channel is the ePDCCH.

20 Claims, 5 Drawing Sheets

(51) Int. Cl.
    *H04W 74/08* (2009.01)
    *H04W 74/00* (2009.01)

(56) References Cited

FOREIGN PATENT DOCUMENTS

| CN | 102238752 A | 11/2011 | | |
|----|-------------|---------|---|---|
| CN | 102291822 A | 12/2011 | | |
| CN | 102291845 A | 12/2011 | | |
| GB | WO 2012104630 A1 * | 8/2012 | ............ | H04L 5/0039 |

OTHER PUBLICATIONS

R1-113589, Way Forward on downlink control channel enhancements by UE-specific RS.*
R1-114267, 3GPP TSG RAN WG1 Meeting #67 R1-114267, San Francisco, USA, Nov. 14-18, 2011, Agenda item: 7.8, Source: IP Wireless Inc., Title: Review of approaches for bandwidth reduction for low complexity MTC LTE UEs.*
R1-113691, titled "The VU-ePDCCH design framework"; 3GPP TSG RAN WG1 Meeting #67; Discussion and decision—Agenda Item: 7.7, (R1-113691 hereinafter) was published Nov. 14-18, 2011.*
Ko et al., titled "A Novel Random Access for Fixed-Location Machine-to-Machine Communications in OFDMA Based Systems", (KO hereinafter) was originally published in IEEE Communications Letters, vol. 16, No. 9, pp. 1428-1431, Sep. 2012, doi: 10.1109/LCOMM.2012.072012.120788.*
R1-114082, titled "Issues Regarding LTE Network for Low Cost MTC", Agenda Item: 7.8 Document for: Discussion and Decision, 3GPP TSG RAN WG1 Meeting #67, (R1-114082 hereinafter) was published Nov. 14-18, 2011.*

* cited by examiner

INFORMATION PROCESSING METHOD AND METHOD FOR UE RANDOM ACCESSING LTE SYSTEM

TECHNICAL FIELD

The present document relates to the field of wireless communication, and more particularly, to a method for processing information, a method for a machine-to-machine user equipment (MTC UE) randomly accessing the LTE system, an evolved NodeB and a machine-to-machine user equipment.

BACKGROUND OF THE RELATED ART

Machine to machine (referred to as M2M; also called MTC, Machine Type Communication) user equipment (referred to as UE), also known as M2M user communication device, is a main application form of Internet of things at the current stage. Low power consumption and low cost are important guarantees for its large-scale applications. Currently, the M2M technology has been supported by internationally renowned manufacturers such as NEC, HP, CA, Intel, IBM and AT&T and recognized by mobile operators in countries. The M2M devices currently deployed in the market are mainly based on the Global System of Mobile Communication (GSM) system. In recent years, due to the high spectrum efficiency of the long-term evolution (LTE), more and more mobile carriers select the LTE as the evolution direction of the future broadband wireless communication system. Various LTE-based M2M data services will be more attractive. Only the cost of the LTE-M2M devices is lower than that of the MTC user equipment in the GSM system, can the M2M service really go from the GSM to the LTE system.

What mainly affect the cost of the MTC UE lies in the baseband processing and radio frequency. And reducing the transmission and reception bandwidth is a very effective way to reduce the MTC UE cost. That is, the transmission and reception bandwidth of the MTC UE is less than the maximum transmission and reception bandwidth 20 MHz supported on a single carrier of the conventional LTE user equipment (Ordinary Legacy R8/9/10 UE, referred to as OL UE). The reception and transmission bandwidth of the MTC UE can be set to a small bandwidth such as 1.4 MHz or 3 MHz or 5 MHz supported by the LTE system, or new carriers are added for the access. As shown in FIG. 1, both the small-bandwidth MTC UE and the conventional UE can access a multi-carrier LTE system.

Like an OLT UE randomly accessing the LTE system, the MTC UE also performs an initial LTE network access via a Physical Random Access Channel (referred to as PRACH) to achieve uplink timing synchronization. Once the user completes the synchronization, a Radio Resource Control (referred to as RRC) connection scheduling request approval of the eNodeB can be obtained. There are two random access modes, contention based access and contention-free access. All possible random accesses can adopt the contention based random access mode.

For a PRACH in the LTE system, one random access channel corresponds to one random access preamble. The preamble comprises a cyclic prefix (referred to as CP) and a group of preamble sequences. The random access preamble has four formats, whose corresponding parameter values are shown in Table 1.

TABLE 1

| Parameter values corresponding to random access preamble formats | | |
|---|---|---|
| Preamble format | $T_{CP}$ | $T_{SEQ}$ |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (only for frame structure of the TDD mode) | $448 \cdot T_s$ | $4096 \cdot T_s$ |

$T_{CP}$ in the abovementioned Table 1 indicates the length of CP, $T_{SEQ}$ indicates the length of sequence and the value of $T_s$ is $T_s=1/(15000 \times 2048)$ seconds. Preamble format 0 is transmitted in an ordinary uplink subframe; preamble formats 1 and 2 are transmitted in two ordinary uplink subframes; preamble format 3 is transmitted in three ordinary uplink subframes; preamble format 4 can only be transmitted in uplink pilot time slot (UpPTS) in the time division duplex (TDD) mode.

In the frequency domain, one random access preamble occupies the bandwidth, i.e. 1.08 MHz, corresponding to six resource blocks (RBs). The PRACHs with the same time domain position are distinguished in the frequency domain. If they have the same time and frequency positions, they are distinguished through the preamble sequence sent by the UE.

The PRACH has a plurality of time and frequency position configuration schemes, which need to be obtained by looking up the table according to the parameters prach-ConfigurationIndex indicated by the high level. Frequency division duplex (FDD) and TDD have different time and frequency structures. The FDD preamble formats 0-3 have 64 kinds of random access frame structure configurations, and each configuration corresponds to a preamble format, a system frame number and a subframe number accessible by each frame.

There are also 64 kinds of PRACH configurations allowed by the frame structures of the TDD preamble formats 0-4. Each configuration index corresponds to a combination of a determined preamble format, a PRACH density value $D_{RA}$ and a version index $r_{RA}$. For the TDD, each subframe may have a plurality of random access resources, depending on the UL/DL configuration. For a determined PRACH density value, the time-frequency physical resources needed by different random accesses are indicated with a group of four symbols $(f_{RA}, t_{RA}^0, t_{RA}^1, t_{RA}^2)$. Wherein, $f_{RA}$ is the frequency resource index in a certain time interval; $t_{RA}^0=0, 1, 2$ respectively indicate that the random access resources are present in all the radio frames, the even-numbered radio frames, or the odd-numbered radio frames; $t_{RA}^1=0, 1$ respectively indicate that the random access resources are located in the first half frame or the second half frame; $t_{RA}^2$ is the uplink subframe number where the preamble starts.

In the LTE, the PRACH resource configuration is cell-specific. For a small-bandwidth system, the cell load is small, then a relatively long random access transmission cycle can be used, for a large-bandwidth system, the cell load is relatively large, then a relatively short transmission cycle can be used. The PRACH time-frequency resources are semi-statically distributed within a physical uplink share channel (referred to as PUSCH) and repeated periodically, as shown in FIG. 2.

Prior to the random access, the OL UE can obtain the random access channel configuration information of the access cell through a broadcast control channel (referred to as BCCH). The information comprises: downlink carrier bandwidth, the number of PRACHs, frequency domain position, time domain cycle, preamble formats of the present cell, the number of preamble ZC root sequences and their serial numbers, power, the maximum number of preamble retransmissions, size of response window, contention resolution timing, and so on. The random access preamble sequence uses a ZC (Zadoff-Chu) sequence with a zero correlation zone, and each cell has 64 kinds of available preamble sequences, which are generated by cyclically shifting one or more of root ZC sequences.

The OL UE may select one of the access time slots, and randomly select one of the 64 kinds of available preambles to access randomly. If a plurality of UEs sends the same preamble in the same time-frequency resources, there will be a contention, and a subsequent contention resolution scheme is needed. The PRACH resources selected by the UE imply the Random Access-Radio Network Temporary Identifier (RA-RNTI). The RA-RNTI is related to the frequency domain position at which the UE receives and monitors a random access response and the reception discrimination.

Some problems, for example, how to configure the PRACH resources, will occur when a low-cost and bandwidth-limited MTC UE randomly accesses the LTE system. Furthermore, since the physical downlink control channel (referred to as PDCCH) is whole bandwidth interleaving, and the bandwidth-limited MTC UE may not be able to receive all of the PDCCH control information sent by the large-bandwidth of system, the random access response decoding is difficult, and the success of random access is seriously affected.

The control information transmitted by the enhanced PDCCH (referred to as ePDCCH) comprise the same content as the original PDCCH, and the ePDCCH is located within the PDSCH region, occupying bandwidth resource of one RB, and multiplexing with the PDSCH via the frequency division mode. The bandwidth-limited MTC UE can receive the ePDCCH as well as all information of the PDSCH indicated by the ePDCCH. Moreover, only the R11 UE and the bandwidth-limited MTC UE can identify the ePDCCH, while the conventional OL UE cannot.

There is no effective solution proposed yet for problems of the low-cost bandwidth-limited MTC UE randomly accessing the LTE system.

SUMMARY OF THE INVENTION

The embodiment of the present invention provides an information processing method, a method for a machine-to-machine user equipment randomly accessing the LTE system, an evolved NodeB and a machine-to-machine user equipment, to solve problems, for example, the MTC UE is not able to receive all the PDCCH control information sent by the large-bandwidth of system, the random access response decoding is difficult and the success of random access is seriously affected, and so on, occurring in the existing process of a MTC UE randomly accessing the LTE system.

The embodiment of the present invention provides an information processing method, and the method comprises:

an evolved nodeB (eNodeB) sending information of physical random access channel (PRACH) resources configured for a machine-to-machine user equipment (MTC UE) to the MTC UE through a physical downlink shared channel (PDSCH) indicated by a downlink control channel;

the eNodeB sending downlink control information and a random access response (RAR) after receiving a random access preamble sequence sent by the MTC UE;

wherein the downlink control channel is an enhanced physical downlink control channel (ePDCCH); or information carried in a physical broadcast channel (PBCH) indicates that the downlink control channel is the ePDCCH or a physical downlink control channel; or, when a Long Term Evolution (LTE) system bandwidth is less than or equal to a reception bandwidth of the MTC UE, the downlink control channel is a physical downlink control channel, and when the LTE system bandwidth is greater than the reception bandwidth of the MTC UE, the downlink control channel is the ePDCCH.

Preferably, the method further comprises:

after receiving the same random access preamble sequence sent by a plurality of the MTC UEs, the eNodeB returning a contention resolution message to a MTC UE accessing successfully through the PDSCH indicated by the downlink control channel.

Preferably, the position of a time domain orthogonal frequency division multiplexing (OFDM) symbol of the ePDCCH in a subframe is a fixed position.

Preferably, before the eNodeB sends PRACH resources configured for a MTC UE to the MTC UE, the method further comprises:

the eNodeB configuring the PRACH resources for the MTC UE.

Preferably, when the downlink control channel is the ePDCCH, the eNodeB configuring the PRACH resources for the MTC UE comprises:

the eNodeB configuring dedicated PRACH resources for the MTC UE, wherein the dedicated PRACH resources comprise frequency-domain resources, time-domain resources and preamble sequence resources;

the eNodeB configuring parts of PRACH resources used by an ordinary legacy R8/9/10 user equipment (OL UE) for the MTC UE; or the eNodeB configuring all of PRACH resources used by the OL UE for the MTC UE.

Preferably, the position of PDSCH is indicated by the ePDCCH in a present frame or across frames.

Preferably, the eNodeB sends the downlink control information after receiving a random access preamble sequence sent by the MTC UE, comprising:

if the PRACH resources are dedicated PRACH resources configured for the MTC UE, after receiving the random access preamble sequence on the PRACH resources, the eNodeB sending the ePDCCH scrambled with a random access Radio Network Temporary Identifier (RA-RNTI) on a predefined reception bandwidth of the MTC UE;

if the PRACH resources are parts of the PRACH resources used by the OL UE and configured for the MTC UE, after receiving the random access preamble sequence on the PRACH resources, the eNodeB sending the ePDCCH scrambled with the RA-RNTI and the PDCCH scrambled with the RA-RNTI when the random access preamble sequence is shared by the MTC UE and the OL UE, and sending the PDCCH scrambled by the RA-RNTI when the random access preamble sequence is exclusively used by the OL UE;

if the PRACH resources are all of the PRACH resources used by the OL UE and configured for the MTC UE, then after receiving the random access preamble sequence on the PRACH resources, the eNodeB sending the ePDCCH scrambled with the RA-RNTI and the PDCCH scrambled with the RA-RNTI.

The embodiment of the present invention provides a method for a machine-to-machine user equipment (MTC UE) randomly accessing the Long Term Evolution (LTE) system, and the method comprises:

the MTC UE receiving Physical random access channel (PRACH) resource configuration information sent by an evolved nodeB through a physical downlink shared channel (PDSCH) indicated by a downlink control channel, and sending a random access preamble sequence to the evolved nodeB on the PRACH resources indicated by the PRACH resource configuration information;

the MTC UE using a random access radio network temporary identifier (RA-RNTI) to monitor the downlink control channel, reading information carried in a random access response (RAR) sent by the eNodeB from the PDSCH indicated by the monitored downlink control channel;

the MTC UE sending uplink data to the eNodeB through a physical uplink share channel (PUSCH) according to the information carried in the RAR;

wherein the downlink control channel is an enhanced physical downlink control channel (ePDCCH); or, after the MTC UE receives a physical broadcast channel (PBCH), information carried by the PBCH is used to determine that the downlink control channel is the ePDCCH or a physical downlink control channel; alternatively, the MTC UE obtains a system bandwidth, when the long-term evolution (LTE) system bandwidth is less than or equal to the reception bandwidth of the MTC UE, the downlink control channel is a physical downlink control channel, when the LTE system bandwidth is greater than the reception bandwidth of the MTC UE, the downlink control channel is the ePDCCH.

Preferably, after the MTC UE sends the uplink data to the eNodeB through the PUSCH, the method further comprises:

the MTC UE taking a temporary cell radio network temporary identifier (C-RNTI) to monitor the downlink control channel, reading a contention resolution message from the PDSCH indicated by the monitored downlink control channel, and judging whether the random access of the MTC UE is successful or not according to the contention resolution message, and upgrading the temporary C-RNTI to a C-RNTI if the access is successful.

The embodiment of the present invention further provides an evolved NodeB, and the evolved NodeB comprises:

a sending module, which is configured to send physical random access channel (PRACH) resource information configured for a machine-to-machine user equipment (MTC UE) to the MTC UE through a physical downlink shared channel (PDSCH) indicated by a downlink control channel;

a processing module, which is configured to send downlink control information and a random access response (RAR) after receiving a random access preamble sequence sent by the MTC UE;

wherein the downlink control channel is an enhanced physical downlink control channel (ePDCCH); or, the information carried in a physical broadcast channel (PBCH) indicates that the downlink control channel is the ePDCCH or a physical downlink control channel; or, when the Long Term Evolution (LTE) system bandwidth is less than or equal to the reception bandwidth of the MTC UE, the downlink control channel is a physical downlink control channel, when the LTE system bandwidth is greater than the reception bandwidth of the MTC UE, the downlink control channel is the ePDCCH.

Preferably, the sending module is further configured to, after receiving the same random access preamble sequence sent by a plurality of the MTC UEs, return a contention resolution message to the MTC UE accessing successfully through the PDSCH indicated by the downlink control channel.

Preferably, the evolved NodeB further comprises: a configuring module, which is configured to configure the PRACH resources for the MTC UE, and send the PRACH resources to the sending module.

Preferably, the configuring module is configured to:

configure dedicated PRACH resources for the MTC UE, wherein the dedicated PRACH resources comprise frequency-domain resources, time-domain resources and preamble sequence resources;

configure parts of the PRACH resources used by an ordinary legacy R8/9/10 user equipment (OL UE) for the MTC UE; or configure all of PRACH resources used by the OL UE for the MTC UE.

Preferably, the position of PDSCH is indicated by the ePDCCH in a present frame or across frames.

Preferably, the sending module is configured to:

if the PRACH resources are dedicated PRACH resources configured for the MTC UE, after receiving the random access preamble sequence on the PRACH resources, only send an ePDCCH scrambled with a random access radio network temporary identifier (RA-RNTI);

if the PRACH resources are parts of the PRACH resources used by the OL UE and configured for the MTC UE, after receiving the random access preamble sequence on the PRACH resources, send the ePDCCH scrambled with the RA-RNTI and the PDCCH scrambled with the RA-RNTI when the random access preamble sequence is shared by the MTC UE and the OL UE, and send the PDCCH scrambled with the RA-RNTI when the random access preamble sequence is exclusively used by the OL UE;

if the PRACH resources are all of the PRACH resources used by the OL UE and configured for the MTC UE, then after receiving the random access preamble sequence on the PRACH resources, send the ePDCCH scrambled with the RA-RNTI and the PDCCH scrambled with the RA-RNTI.

The embodiment of the present invention further provides a machine-to-machine user equipment, and the user equipment comprises:

a transceiver module, which is configured to receive physical random access channel (PRACH) resource configuration information sent by the eNodeB via a physical downlink share channel (PDSCH) indicated by a downlink control channel, and send a random access preamble sequence to the eNodeB on the PRACH resources indicated by the PRACH resource configuration information;

a reading module, which is configured to use a random access radio network temporary identifier (RA-RNTI) to monitor the downlink control channel, and read out information carried in a random access response (RAR) sent by the eNodeB from a PDSCH indicated in the monitored downlink control channel;

a data sending module, which is configured to send uplink data to the eNodeB through a physical uplink share channel (PUSCH) according to the information carried in the RAR;

wherein the downlink control channel is an enhanced physical downlink control channel (ePDCCH); or, after receiving a physical broadcast channel (PBCH), the MTC UE determines that the downlink control channel is the ePDCCH or a physical downlink control channel through information carried by the PBCH; alternatively, the MTC UE obtains a system bandwidth, when the long-term evolution (LTE) system bandwidth is less than or equal to a reception bandwidth of the MTC UE, the downlink control channel is a physical downlink control channel, when the LTE system bandwidth is greater than the reception bandwidth of the MTC UE, the downlink control channel is the ePDCCH.

Preferably, the user equipment further comprises:

an accessing module, which is configured to use a temporary cell radio network temporary identifier (C-RNTI) to monitor the downlink control channel, read out a contention resolution message from the PDSCH indicated in the monitored downlink control channel, and judge whether the random access of the MTC UE is successful or not according to the contention resolution message, and upgrade the temporary C-RNTI to a C-RNTI if the access is successful.

The abovementioned information processing method, the method for a machine-to-machine user equipment randomly accessing the LTE system, the evolved NodeB and the machine-to-machine user equipment solve the problem of a bandwidth-limited MTC user equipment randomly accessing the LTE system, especially the problems of PRACH resource allocation and frequency-domain reception position of the RAR response; in addition, it greatly reduces the cost of the LTE based MTC UE without affecting the performance of the LTE system, and promotes the MTC service evolving from the GSM system to the LTE system.

PREFERRED EMBODIMENTS OF THE INVENTION

Figure 1:
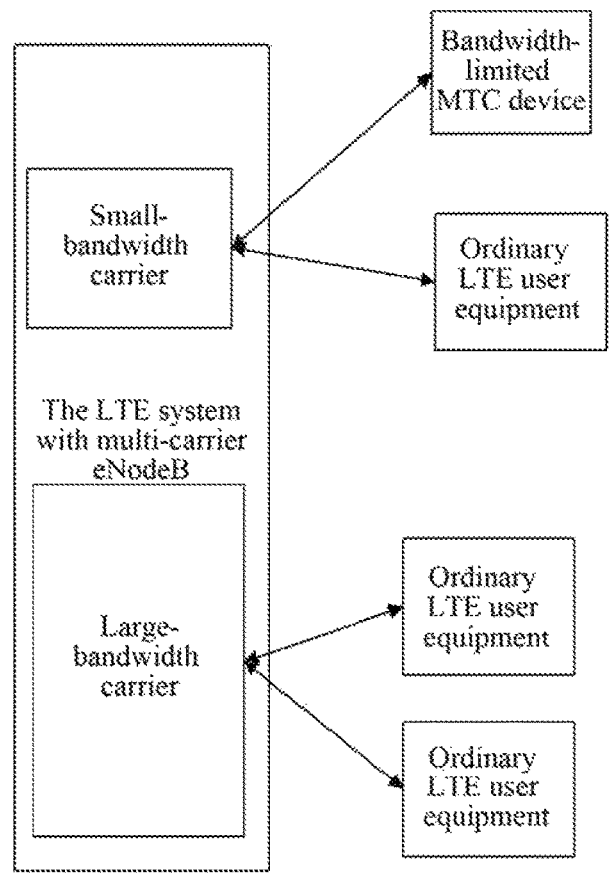
FIG. 1 is a schematic diagram of a LTE multi-carrier system supporting small-bandwidth MTC user equipment in the related art.
Figure 2:
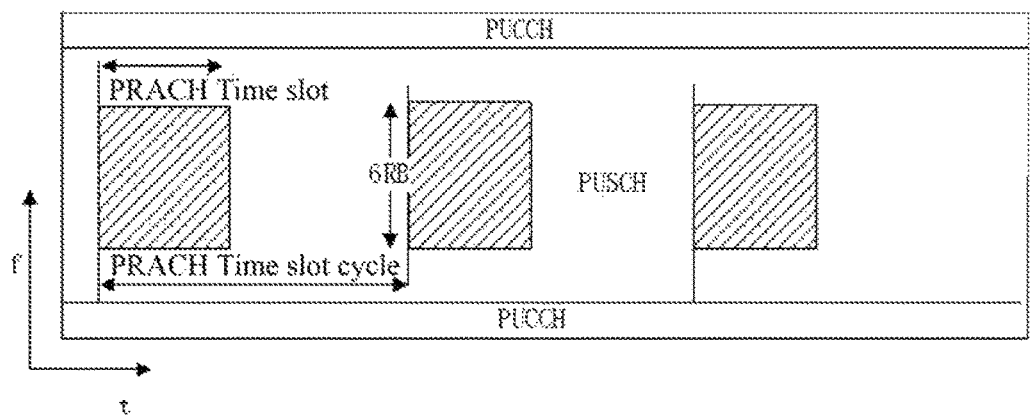
FIG. 2 is a schematic diagram of the time-frequency structure of a random access PRACH in the related art.

Hereinafter in conjunction with the accompanying drawings, the embodiments of the present invention will be described in detail. It should be noted that in the case of no conflict, embodiments of the present application and various modes in the embodiments may be combined with each other.

The embodiment of the present invention provides an information processing method, the method is described from the evolved NodeB side, and the method comprises:

in step 11, an evolved NodeB (eNodeB) sends information of physical random access channel (PRACH) resource configured for a machine-to-machine user equipment (MTC UE) to the MTC UE through a physical downlink share channel (PDSCH) indicated by a downlink control channel;

wherein the downlink control channel is an enhanced physical downlink control channel (ePDCCH); or information carried on a physical broadcast channel (PBCH) indicates that the downlink control channel is the ePDCCH or a physical downlink control channel; or, when the Long Term Evolution (LTE) system bandwidth is less than or equal to the reception bandwidth of the MTC UE, the downlink control channel is a physical downlink control channel, when the LTE system bandwidth is greater than the reception bandwidth of the MTC UE, the downlink control channel is the ePDCCH.

In step 12, after receiving a random access preamble sequence sent by the MTC UE, the eNodeB sends downlink control information and a random access response (RAR).

Furthermore, after this step, it may further comprise:

in step 13, after receiving the same random access preamble sequence sent by a plurality of the MTC UEs, the eNodeB returns a contention resolution message to the MTC UE accessing successfully through the PDSCH indicated by the downlink control channel.

The embodiment of the present invention further provides a method for a MTC UE randomly accessing the LTE system, and the method is described from the user equipment side, and the method comprises:

in step 21, the MTC UE receives the physical random access channel (PRACH) resource configuration information sent by the eNodeB through the physical downlink shared channel (PDSCH) indicated by the downlink control channel, and sends a random access preamble sequence to the eNodeB on the PRACH resources indicated by the PRACH resource configuration information;

wherein the downlink control channel is an enhanced physical downlink control channel (ePDCCH); or, after the MTC UE receives a physical broadcast channel (PBCH), the information carried by the PBCH is used to determine that the downlink control channel is the ePDCCH or a physical downlink control channel; alternatively, the MTC UE obtains a system bandwidth, when the long-term evolution (LTE) system bandwidth is less than or equal to the reception bandwidth of the MTC UE, the downlink control channel is a physical downlink control channel, and when the LTE system bandwidth is greater than the reception bandwidth of the MTC UE, the downlink control channel is the ePDCCH.

In step 22, the MTC UE takes a random access radio network temporary identifier (RA-RNTI) to monitor the downlink control channel, and reads the information carried in a random access response (RAR) sent by the eNodeB from the PDSCH indicated in the monitored downlink control channel;

in step 23, the MTC UE sends uplink data to the eNodeB through the physical uplink shared channel (PUSCH) according to the information carried in the RAR.

Furthermore, after this step, it may further comprise:

in step 24, the MTC UE takes a temporary cell radio network temporary identifier (C-RNTI) to monitor the downlink control channel, reads out a contention resolution message from the PDSCH indicated in the monitored downlink control channel, judges whether the random access of the MTC UE is successful or not in accordance with the contention resolution message, and upgrades the temporary C-RNTI to a C-RNTI if the access is successful.

The reception and transmission bandwidth of a bandwidth-limited MTC UE can be set to a small bandwidth such as 1.4 MHz, 3 MHz or 5 MHz supported by the LTE system. In the following, the reception and transmission bandwidth being minimum bandwidth of 1.4 MHz is taken for example to specifically elaborate the implementation method for a MTC UE randomly accessing the LTE system, and other small-bandwidth access processes are similar.

The First Embodiment

Figure 3:
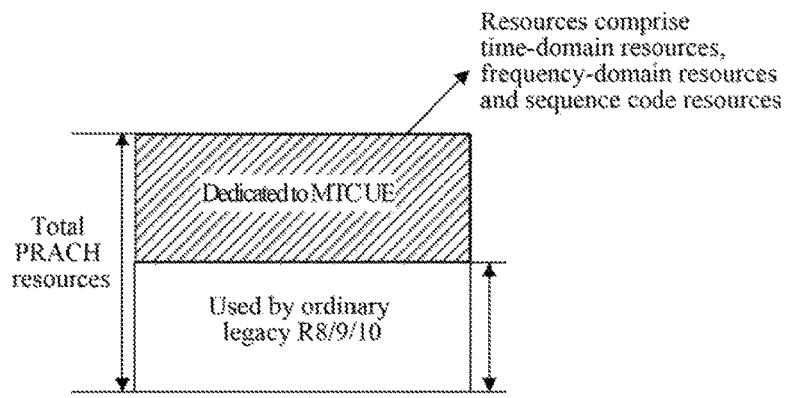
FIG. 3 is a schematic diagram of a first method for MTC UE PRACH resource configuration in a random access in accordance with an embodiment of the present invention.

The present embodiment will be described for the FDD system, wherein the method for PRACH resource configuration of a MTC UE is the first method, as shown in FIG. 3. Dedicated time domain resources are configured, and the preamble sequence can be the same as that the OL UE has. The eNodeB can distinguish the type of the random access UE through the dedicated PRACH resources. The method for the eNodeB sending the downlink control information to the MTC UE is using the ePDCCH, and the method for the ePDCCH indicating the PDSCH is the indication across frames.

Specifically, the eNodeB allocates the sub-frame 2 whose index parameter is 26 and configured by the PRACH of the cell to the MTC UE, and the remaining sub-frames 5 and 8 are used by the OL UE, and the related PRACH configuration information is notified to the OL UE through the BCCH.

Figure 4:
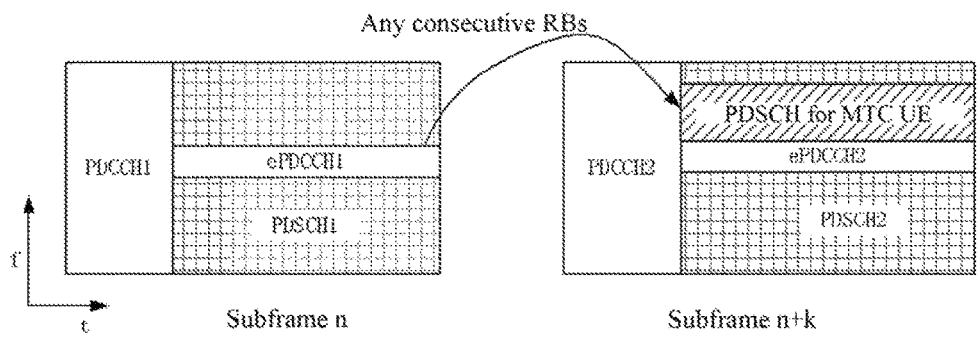
FIG. 4 is a schematic diagram of an ePDCCH scheduling a PDSCH across frames in accordance with an embodiment of the present invention.

The eNodeB sends the PRACH resource configuration information of the MTC UE to the UE through the PDSCH, and the PDSCH position is indicated by the ePDCCH across frames, as shown in FIG. 4, the eNodeB schedules the PDSCH2 on the sub-frame n+k through the ePDCCH1 on the central six RBs of the subframe n, and the PDSCH2 may be located within any six consecutive RBs in the system bandwidth.

Figure 5:
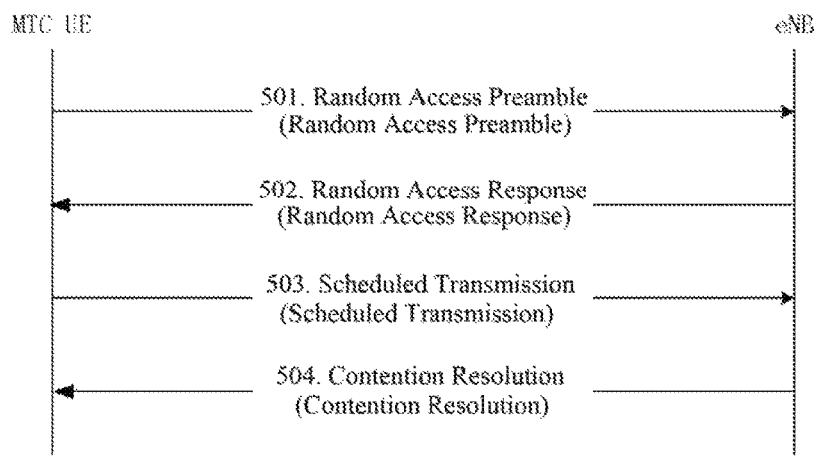
FIG. 5 is a schematic diagram of a process of a random access MTC UE interacting with an eNodeB in an LTE system in accordance with an embodiment of the present invention.

As shown in FIG. 5, it is a schematic diagram of the process of a random access MTC UE interacting with an eNodeB in the LTE system in accordance with an embodiment of the present invention, and the specific random access process mainly comprises the following steps:

in step 501, the MTC UE only receives the PRACH resource configuration information obtained on the six RBs at the corresponding frequency domain position in the subframe n+k; in accordance with this information, the preamble sequence, that is message 1, can be sent on the central six RBs of the sub-frame 2 of any system frame. This message only transmits the preamble sequence code but not any user data information. Other MTC UEs in the same cell may also send the same preamble sequence on the same time-frequency PRACH resources. A subsequent contention resolution mechanism is required;

in step 502, after detecting the random access preamble sequence, the eNodeB knows that the UE is a MTC UE. Meanwhile, the distance d between the UE and the eNodeB is measured according to the cyclic shift of the received preamble sequence and a timing adjustment amount TA=2d/c (c is the speed of light) is generated, so that the UE can obtain uplink synchronization. Then the message2: a random access response (RAR) is sent through the PDSCH;

the PDSCH position is indicated by the ePDCCH across frames. The content carried on the PDSCH comprises: responded preamble identifier; timing adjustment amount TA; Temporary Cell-Radio Network Temporary Identifier (referred to as Temporary C-RNTI); uplink scheduling information (resource allocation, the size of transport block);

meanwhile, the MTC UE starts to take the RA-RNTI as an identifier to monitor the corresponding ePDCCH within one RAR time window from the third subframe after sending the message1. The starting and ending of a time window are set by the eNodeB. The detected ePDCCH will indicate the position of the corresponding PDSCH, and the MTC UE reads out content of the abovementioned random access response from the PDSCH according to the indication.

If the RA preamble identifier in the RAR received by the MTC UE corresponds to the transmitted preamble code, the RAR reception is considered as a success, and the MTC UE stops monitoring the ePDCCH. If a plurality of UEs selects the same preamble sequence within the same time-frequency resources, the UEs will respectively receive the RAR. If a response belonging to the UE is not received within the time window, or the received preamble identifier does not correspond to the transmitted one, the RAR reception is indicated as a failure, and the number of preamble transmissions is added by one. If the maximum number of preamble transmissions is reached, reporting to the high level, otherwise, step 503 is performed;

in step 503, the MTC UE which successfully receives the RAR transmits the uplink data message3, whose content comprises: RRC connection request and non-access stratum (NAS) UE ID, through the PUSCH according to the scheduling information and timing adjustment information TA in the RAR. The size of transport block and location of the PUSCH depend on the uplink scheduling permission in the RAR in step 502;

in step 504, the eNodeB detects the message3 and generates an ACK/NACK; then returns a contention resolution message, that is, the resolution message4 comprising the NAS UE ID which is allowed to access, to the UE accessing successfully. If a MTC UE is selected to access, only the control information ePDCCH needs to be sent, if an OL UE is selected to access, only the PDCCH needs to be sent.

Meanwhile, after sending the message3, the MTC UE takes the Temporary C-RNTI as the identifier to monitor the ePDCCH in the control sub-frame, until the contention resolution timer expires or is stopped, reads out the corresponding information from the indicated PDSCH after detecting an ePDCCH, and sends an ACK to MTC UEs which have the same NAS ID as its own, and upgrades the temporary C-RNTI to a C-RNTI, and the random access completes successfully. The UE which does not detect its own NAS ID knows that a conflict occurs in the access process, i.e., the random access fails; the cache is cleared, a preamble sequence is selected again after a period of time to perform the next random access, and the step 501 is repeated.

Figure 6:
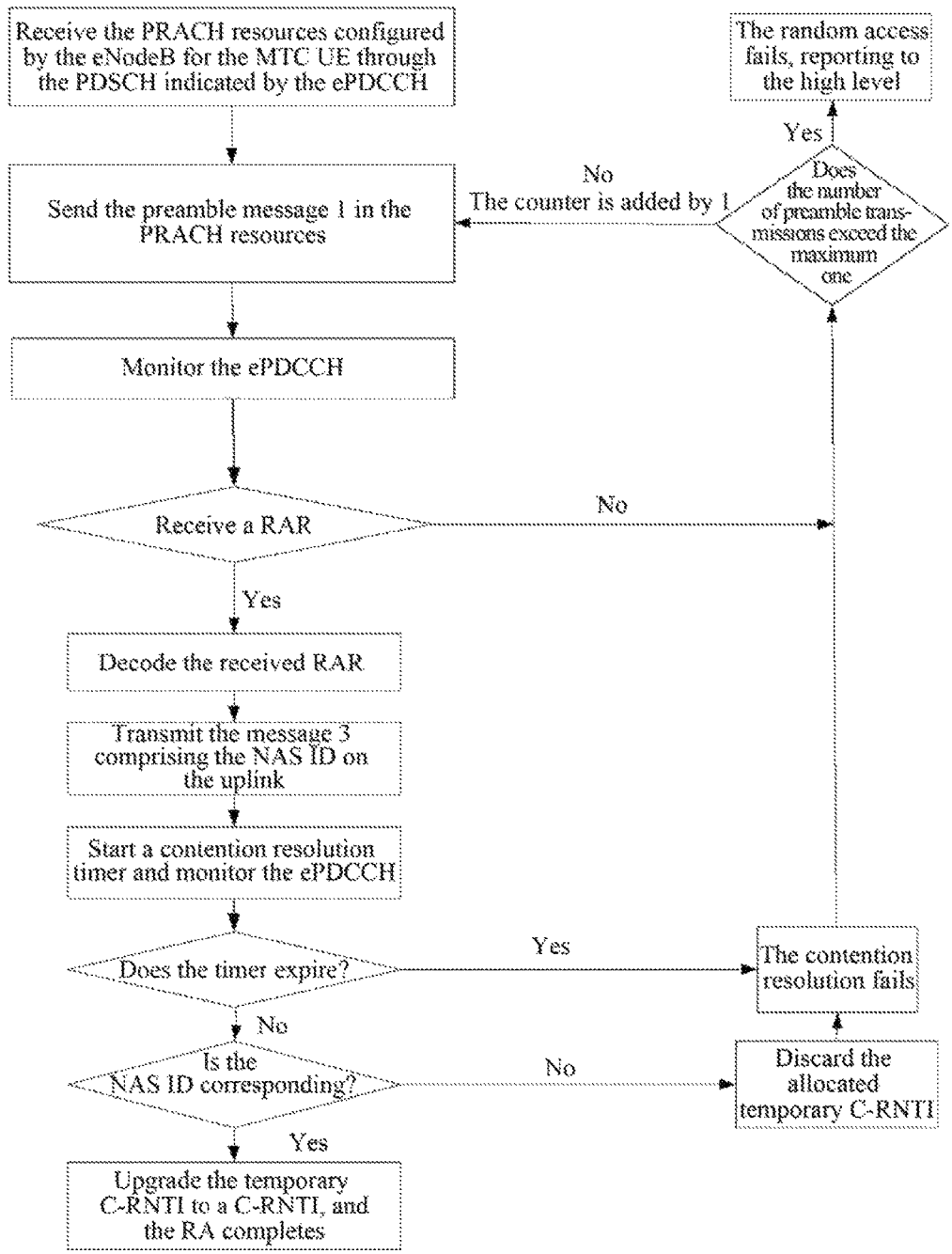
FIG. 6 is a schematic diagram of a random access processing process at the MTC UE side in FIG. 5.

The specific processing process at the MTC UE side in the random access process is shown in FIG. 6.

The Second Embodiment

The present embodiment will be described for the FDD system, wherein the method for configuring the PRACH resources of the MTC UE is according to the first method, and dedicated preamble sequence code resources are configured, while the access slots may be the same as other OL UEs have. The eNodeB can distinguish the type of the random access UE according to the received preamble sequence. The downlink control channel transmitted by the eNodeB is indicated through the PBCH and indicated as ePDCCH. The method for the ePDCCH indicating the PDSCH is the indication in a present frame.

Specifically, the 64 kinds of preamble sequences in the access cell are divided into two parts, wherein a part of $N_{MTC}$ is the dedicated preamble codes selected for the MTC UE access, and the remaining 64-NMTC are preamble codes selected for the OL UE access and broadcasted to the OL UE. Therefore, even if the UE sends the random access in the same time-frequency resources, the eNodeB can also distinguish the MTC UE through the content of the transmitted preamble code.

Figure 7:
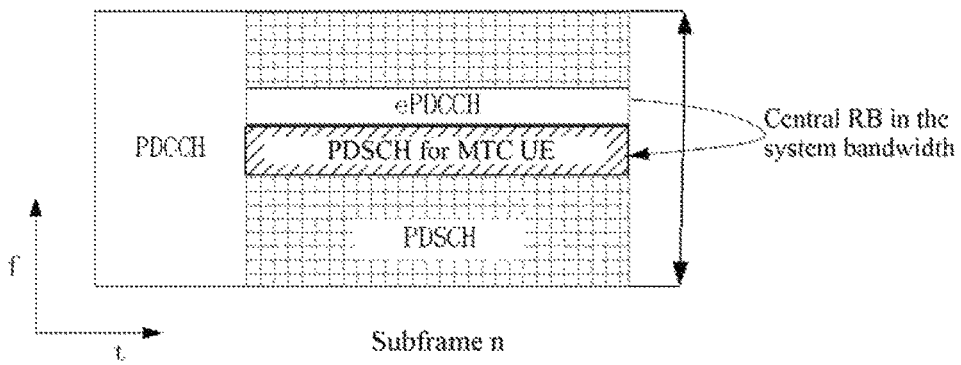
FIG. 7 is the schematic diagram of an ePDCCH scheduling a PDSCH in a present frame.

The eNodeB sends the PRACH resource configuration information of the MTC UE to the UE through the PDSCH, and the position of PDSCH is indicated by the ePDCCH, as shown in FIG. 7. The eNodeB schedules the PDSCH1 in the present subframe through the ePDCCH1 on the central six RBs in the system bandwidth of the subframe n. The central six RBs in the system bandwidth are shared by the PDSCH1 and the ePDCCH1. The UE must be aligned with the central six RBs in the system bandwidth during the reception.

The specific access process mainly comprises the following steps:

in step 701, the MTC UE randomly selects one of the $N_{MTC}$ preamble sequences according to the received PRACH configuration information, and then transmits the preamble sequence, that is, message1, on the central six RBs of the random access subframe. This message only transmits the preamble sequence code but not any user data information. Other MTC UEs in the same cell may also transmit the same preamble sequence on the same PRACH resources, so a subsequent contention resolution mechanism is required.

In step 702, the eNodeB measures the distance d between the UE and the eNodeB according to the cyclic shift of the received preamble sequence and generates a timing adjustment amount TA=2d/c (c is the speed of light), so that the UE can obtain the uplink synchronization. After the eNodeB detects a random access sequence, it knows that the UE is a MTC UE, and only the ePDCCH with the RA-RNTI needs to be sent to indicate the position of PDSCH. Moreover, the message2: a random access response (RAR) is sent through the PDSCH indicated by the ePDCCH The content carried on the PDSCH comprises: responded preamble identifier; timing adjustment amount TA; Temporary Cell-Radio Network Temporary Identifier (referred to as Temporary C-RNTI); uplink scheduling information (resource allocation, the size of transport block);

meanwhile, the MTC UE starts to take the RA-RNTI as the identifier to monitor the corresponding ePDCCH within one RAR time window from the third subframe after sending the message1. The starting and ending of a time window are set by the eNodeB. The detected ePDCCH will indicate the position of the corresponding PDSCH, and the UE reads out content of the random access response from the PDSCH according to the indication.

If the RA preamble identifier in the RAR received by the UE corresponds to the transmitted preamble code, the RAR reception is considered as a success, and the UE stops monitoring the ePDCCH. If a plurality of UEs selects the same preamble sequence within the same time-frequency resources, the UEs will respectively receive the RAR. If a response belonging to the UE is not received within the time window, or the received preamble identifier does not correspond to the transmitted one, the RAR reception is indicated as a failure, and the number of preamble transmissions is added by one. If the maximum number of preamble transmissions is reached, reporting to the high level, and if the maximum number of preamble transmissions is not reached, step 703 is performed;

in step 703, the MTC UE which successfully receives the RAR transmits the uplink data message3, whose content comprises: RRC connection request; non-access stratum (NAS) UE ID, through the PUSCH according to the scheduling information and timing adjustment information TA in the RAR. The size of transport block and location of the PUSCH depend on the uplink scheduling permission in the RAR in step 702;

in step 704, the eNodeB detects the message3 and generates an ACK/NACK; then returns a contention resolution message, that is, the resolution message4 comprising the NAS UE ID which is allowed to access, to the UE accessing successfully. If a MTC UE is selected to access, only the ePDCCH needs to be sent, if an OL UE is selected to access, only the PDCCH needs to be sent.

Meanwhile, after sending the message3, the MTC UE takes the Temporary C-RNTI as the identifier to monitor the ePDCCH in the control subframe until the contention resolution timer expires or is stopped, reads out information from the indicated PDSCH after detecting the ePDCCH, sends an ACK to MTC UEs which have the same NAS ID as its own, and upgrades the temporary C-RNTI to a C-RNTI, and the random access completes successfully. The UE which does not detect its own NAS ID knows that a conflict occurs in the access process, i.e., the random access fails; the cache is cleared, a preamble sequence is selected again after a period of time to perform the next random access, and step 701 is repeated.

The Third Embodiment

The present embodiment will be described for the TDD system, wherein the method for configuring PRACH resources of the MTC UE is the first method, and dedicated time-domain resources and preamble sequence code resources are configured simultaneously. The eNodeB can distinguish the type of the random access UE through the dedicated PRACH resources. The eNodeB transmits the downlink control information to the MTC UE, not by using a fixed ePDCCH, but indicated through the information carried on the PBCH. The indication in the present embodiment uses the ePDCCH, and the method for the ePDCCH indicating the PDSCH is the indication across frames.

Specifically, the eNodeB allocates the sub-frames 2 and 8 in the four random access resources (0,0,0,1), (0,0,0,2), (0,0,1,1), (0,0,1,2) corresponding to the cell PRACH configuration parameter index of 12 and the UL/DL configuration of 0 to the MTC UE to use exclusively, the remaining subframes 3 and 7 are used by the OL UE. Moreover, the 64 kinds of preamble sequences in the cell are divided into two parts, wherein one part of $N_{MTC}$ is the dedicated preamble codes for the MTC UE access, and the remaining 64-NMTC are preamble codes for the OL UE access, and the OL UE configuration is notified through broadcasting.

The eNodeB sends the PRACH resource configuration information of the MTC UE to the UE through the PDSCH, and the position of PDSCH is indicated by the ePDCCH across frames. The eNodeB schedules the PDSCH2 on subframe n+k through the ePDCCH1 on the central six RBs in the subframe n, and the PDSCH2 may be located within any six consecutive RBs in the system bandwidth, and the UE only receives the six RBs of the corresponding frequency domain position on the subframe n+k to obtain the PRACH resource configuration information.

The specific random access process mainly comprises the following steps:

in step 801, the MTC UE randomly selects one of the $N_{MTC}$ preamble sequences according to the received PRACH configuration information, and transmits the preamble sequence, i.e. message1, on the central six RBs of the subframe 2 or 8 of the random system frame. This message only transmits the preamble sequence code but not any user data information. Other MTC UEs in the same cell may also transmit the same preamble sequence in the same PRACH resources;

in step 802, the eNodeB measures the distance d between the UE and the eNodeB according to the cyclic shift of the received preamble sequence and generates a timing adjustment amount TA=2d/c (c is the speed of light), so that the UE can obtain uplink synchronization. After detecting a random access sequence, the eNodeB knows that the UE is a MTC UE, and it only needs to send the ePDCCH with the RA-RNTI to indicate the position of PDSCH, and then sends the message2: a random access response (RAR);

the content carried in the PDSCH comprises: responded preamble identifier; timing adjustment amount TA; Temporary Cell-Radio Network Temporary Identifier (referred to as Temporary C-RNTI); uplink scheduling information (resource allocation, the size of transport block);

meanwhile, the MTC UE starts to take the RA-RNTI as the identifier to monitor the corresponding ePDCCH within one RAR time window from the third subframe after sending the message1. The starting and ending of a time window are set by the eNodeB. The detected ePDCCH will indicate the position of the corresponding PDSCH, and the UE reads out content of the random access response from the PDSCH according to the indication.

If the RA preamble identifier in the RAR received by the UE corresponds to the transmitted preamble code, the RAR reception is considered as a success, and the MTC UE stops monitoring the ePDCCH. If a plurality of UEs selects the same preamble sequence within the same time-frequency resources, the UEs will respectively receive the RAR. If a response belonging to the UE is not received within the time window, or the received preamble identifier does not correspond to the transmitted one, the RAR reception is indicated as a failure and the number of preamble transmissions is added by one. If the maximum number of preamble transmissions is reached, reporting to the high level, and if the maximum number of preamble transmissions is not reached, it is to proceed to step 803;

in step 803, the MTC UE which successfully receives the RAR transmits the uplink data message3, whose content comprises: RRC connection request; non-access stratum (NAS) UE ID, through the PUSCH according to the scheduling information and timing adjustment information TA in the RAR. The size of transport block and location of the PUSCH depend on the uplink scheduling permission in the RAR in step 802;

in step 804, the eNodeB detects the message3 and generates an ACK/NACK; then returns a contention resolution message, that is, the resolution message4 comprising the NAS UE ID which is allowed to access, to the UE accessing successfully. If a MTC UE is selected to access, only the ePDCCH needs to be sent, if an OL UE is selected to access, only the PDCCH needs to be sent.

Meanwhile, after sending the message3, the MTC UE takes the Temporary C-RNTI as the identifier to monitor the ePDCCH in the control subframe until the contention resolution timer expires or is stopped, reads out the information from the indicated PDSCH after detecting the ePDCCH and sends an ACK to MTC UEs which have the same NAS ID as its own, and upgrades the temporary C-RNTI to a C-RNTI, and the random access completes successfully. The UE which does not detect its own NAS ID knows that a conflict occurs in the access process, i.e., the random access fails; the cache is cleared, and a preamble sequence is select again after a period of time to perform the next random access, and step 801 is repeated.

The Fourth Embodiment

Figure 8:
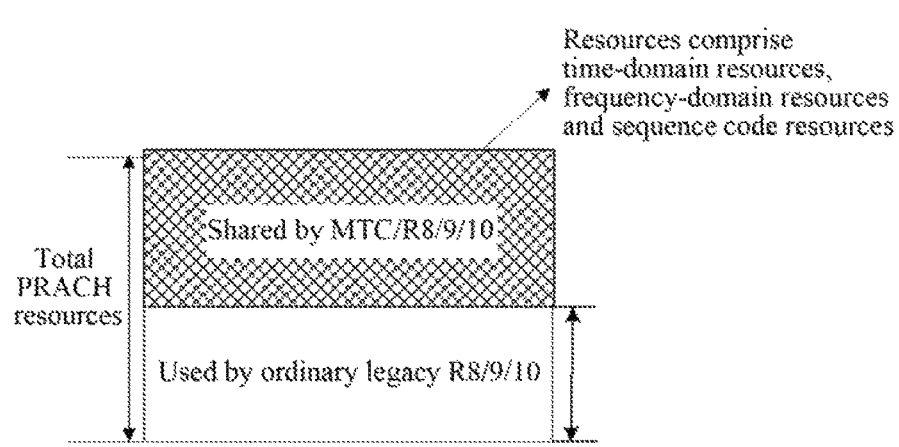
FIG. 8 is a schematic diagram of a second method for MTC UE PRACH resource configuration in a random access in accordance with an embodiment of the present invention.

The present embodiment will be described for the FDD system, and the system bandwidth is 10 MHz. Wherein, the method for configuring the PRACH resources of the MTC UE is the second method, as shown in FIG. 8. The eNodeB configures one part of the random access resources in the LTE cell to be shared by the MTC UE and the OL UE and the other part to be exclusively used by the OL UE. The PRACH resources can be time-domain or preamble sequence resources. The transceiver bandwidth and the system bandwidth of the MTC UE are compared to judge whether to use the ePDCCH or the PDCCH. Herein it is clear that the system bandwidth is greater than the transceiver bandwidth of the MTC UE, so that the downlink control information is sent through the ePDCCH. Moreover, the method for the ePDCCH indicating the PDSCH is the indication in a present frame.

Specifically, the eNodeB configures the subframes 1 and 3 of any system frame in the PRACH parameter index 45 as random access subframes shared by the MTC UE and the OL UE via the higher layer signaling, and the remaining subframes 5, 7 and 9 can only be used for the random access of conventional OL UEs.

The eNodeB sends the PRACH resource configuration information of the MTC UE through the PDSCH indicated by the ePDCCH. Specifically, the eNodeB schedules the PDSCH1 in the present subframe through the ePDCCH1 on the central six RBs in the system bandwidth of the subframe n, and the PDSCH1 and the ePDCCH1 share the central six RBs in the system bandwidth. During the reception, the UE must be aligned with the central six RBs in the system bandwidth.

The process of the MTC UE randomly accessing the LTE system mainly comprises the following steps:

in step 901, the MTC UE transmits the preamble sequence, i.e. message1, on the central six RBs of the random access subframe 1 or 3 according to the received PRACH configuration information. This message only transmits the preamble sequence code but not any user data information. Other MTC or OL UEs in the same cell may also transmit the same preamble sequence on the same PRACH resources; this requires a subsequent contention resolution mechanism;

in step 902, the eNodeB measures the distance d between the UE and the eNodeB according to the cyclic shift of the received preamble sequence and generates a timing adjustment amount TA=2d/c (c is the speed of light), so that the UE can obtain uplink synchronization. The eNodeB does not know the type of the UE when receiving the preamble transmission in the subframe 1 or 3, and needs to send the ePDCCH and the PDCCH with the RA-RNTI. The PDSCH positions indicated by the ePDCCH and the PDCCH are the same. Moreover, the message2: random access response (RAR) is sent through the PDSCH;

the content carried in the PDSCH comprises: responded preamble identifier; timing adjustment amount TA; Temporary Cell-Radio Network Temporary Identifier (referred to as Temporary C-RNTI); uplink scheduling information (resource allocation, the size of transport block);

Meanwhile, the MTC UE starts to take the RA-RNTI as the identifier to monitor the corresponding ePDCCH within one RAR window from the third subframe after sending the message1. The starting and ending of a time window are set by the eNodeB. The detected ePDCCH will indicate the position of the corresponding PDSCH, and the UE reads out content of the random access response from the PDSCH according to the indication.

If the RA preamble identifier in the RAR received by the UE corresponds to the transmitted preamble code, the RAR reception is considered as a success, and the MTC UE stops monitoring the ePDCCH. If a plurality of UEs selects the same preamble sequence within the same time-frequency resources, the UEs will respectively receive the RAR. If a response belonging to the UE is not received within the time window, or the received preamble identifier does not correspond to the transmitted one, the RAR reception is indicated as a failure, the number of preamble transmissions is added by one. If the maximum number of preamble transmissions is reached, it is to report to the high level, and if the maximum number of preamble transmissions is not reached, it is to proceed to step 903;

in step 903, the MTC UE which successfully receives the RAR transmits the uplink data message3, whose content comprises: RRC connection request; non-access stratum (NAS) UE ID, through the PUSCH according to the scheduling information and the timing adjustment information TA in the RAR. The size of transport block and location of the PUSCH depend on the uplink scheduling permission in the RAR in step 902;

in step 904, the eNodeB detects the message3, knows the type of the random access UE through the NAS UE ID, and generates an ACK/NACK; then it returns a contention resolution message, that is, the resolution message4 comprising the NAS UE ID which is allowed to access, to the UE accessing successfully. If a MTC UE is selected to access, only the ePDCCH needs to be sent, if an OL UE is selected to access, only the PDCCH needs to be sent.

Meanwhile, after sending the message3, the MTC UE takes the Temporary C-RNTI as the identifier to monitor the ePDCCH in the control subframe until the contention resolution timer expires or is stopped, reads out the information from the indicated PDSCH after detecting the ePDCCH, sends an ACK to MTC UEs which have the same NAS ID as its own, and upgrades the temporary C-RNTI to a C-RNTI, and the random access completes successfully. The UE which does not detect its own NAS ID knows that a conflict occurs in the access process, i.e., the random access fails; the cache is cleared, and a preamble sequence is selected again after a period of time to perform the next random access, and step 901 is repeated.

The Fifth Embodiment

Figure 9:
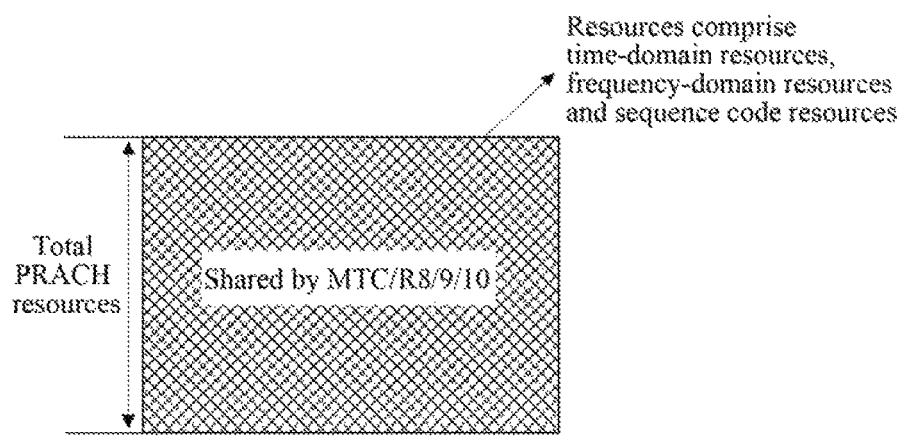
FIG. 9 is a schematic diagram of a third method of MTC UE PRACH resource configuration in a random access in accordance with an embodiment of the present invention.

The present embodiment will be described for the TDD system, and the system bandwidth and the transceiver bandwidth of the MTC UE are the same: 1.4 MHz. The method for configuring the RACH resources of the MTC UE is the third method, as shown in FIG. 9. The resources configured by the eNodeB for the MTC UE are the same as the RACH resources used by other OL UEs in the cell, so that the resources used by the MTC UE will not be limited. Moreover the selection of downlink control channel needs to compare the transceiver bandwidth of the MTC UE with the system bandwidth, and judge whether to use the ePDCCH or the PDCCH. Herein it is clearly that they are equal, therefore the control information is transmitted by sending the physical downlink control channel (PDCCH).

Specifically, the eNodeB configures the same PRACH resource index prach-ConfigurationIndex=28, UL/DL configuration=0 for the MTC UE and the OL UEs in the access cell, i.e., five random access resources are respectively (0,0,0,1), (0,0,1,1), (1,0,0,1), (1,0,1,1), (2,0,0,1). Moreover, the 64 kinds of allocated preamble sequences are the same.

The eNodeB sends the PRACH resource configuration information of the MTC UE to the UE through the PDSCH, and the position of PDSCH is indicated by the PDCCH.

The specific random access process mainly comprises the following steps:

in step 1001, the MTC UE transmits the preamble sequence, i.e. message1, on the central six RBs of the access subframe according to the received PRACH configuration information; this message only transmits the preamble sequence code but not any user data information. Other MTC UEs or OL UEs in the same cell may also transmit the same preamble sequence on the same PRACH resources; this requires a subsequence contention resolution mechanism;

in step 1002, the eNodeB measures the distance d between the UE and the eNodeB according to the cyclic shift of the received preamble sequence and generates a timing adjustment amount TA=2d/c (c is the speed of light), so that the UE can obtain the uplink synchronization. The eNodeB sends the PDCCH after detecting the random access sequence. Moreover, it is to send the message2: random access response (RAR) on the PDSCH;

the content carried on the PDSCH comprises: responded preamble identifier; timing adjustment amount TA; temporary Cell-Radio Network Temporary Identifier (referred to as Temporary C-RNTI); uplink scheduling information (resource allocation, the size of transport block);

meanwhile, the MTC UE starts to take the RA-RNTI as the identifier to monitor the corresponding PDCCH within one RAR time window from the third subframe after sending the message1. The starting and ending of a time window are set by the eNodeB. The detected ePDCCH will indicate the position of the corresponding PDSCH, and the UE reads out content of the random access response from the PDSCH according to the indication.

If the RA preamble identifier in the RAR received by the UE corresponds to the transmitted preamble code, the RAR reception is considered as a success, and the MTC UE stops monitoring the PDCCH. If a plurality of UEs selects the same preamble sequence within the same time-frequency resources, the UEs will respectively receive the RAR. If a response belonging to the UE is not received within the time window, or the received preamble identifier does not correspond to the transmitted one, the RAR reception is indicated as a failure and the number of preamble transmissions is added by one. If the maximum number of preamble transmissions is reached, reporting to the high level, and if the maximum number of preamble transmissions is not reached, it is to proceed to step 1003;

in step 1003, the MTC UE which successfully receives the RAR transmits the uplink data message3, whose content comprises: RRC connection request; non-access stratum (NAS) UE ID, through the PUSCH according to the scheduling information and timing adjustment information TA in the RAR. The size of transport block and location of the PUSCH depend on the uplink scheduling permission in the RAR in step 1002;

in step 1004, the eNodeB detects the message3, knows the type of the random access UE through the NAS UE ID, and generates an ACK/NACK. The eNodeB sends the PDCCH and returns a contention resolution message, that is, the resolution message4 comprising the NAS UE ID which is allowed to access, to the UE accessing successfully.

Meanwhile, after sending the message3, the MTC UE takes the Temporary C-RNTI as the identifier to monitor the PDCCH in the control subframe until the contention resolution timer expires or is stopped, reads out the information from the indicated PDSCH after detecting the ePDCCH, sends an ACK to MTC UEs which have the same NAS ID as its own, and upgrades the temporary C-RNTI to a C-RNTI, and the random access completes successfully. The UE which does not detect its own NAS ID knows that a conflict occurs in the access process, i.e., the random access fails; then the cache is cleared, a preamble sequence is selected again after a period of time to perform the next random access, and the step 1001 is repeated.

The embodiment of the present invention proposes a method for a low-cost bandwidth-limited MTC UE randomly accessing the LTE network on the basis of the original LTE system, especially the resource configuration and the PDSCH location configuration, thereby promoting the M2M service rapidly evolving from the GSM system to the LTE system.

Figure 10:
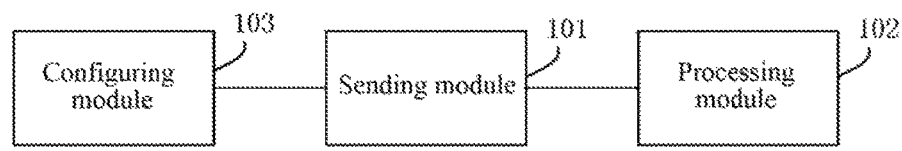
FIG. 10 is a structural diagram of an eNodeB embodiment in accordance with the present invention.

FIG. 10 shows the structural diagram of an eNodeB embodiment of the present invention, and the eNodeB comprises a sending module 101 and a processing module 102, wherein:

the sending module 101 is configured to send physical random access channel (PRACH) resource information configured for a machine-to-machine user equipment (MTC UE) to the MTC UE through a physical downlink share channel (PDSCH) indicated by a downlink control channel;

the processing module 102 is configured to send downlink control information and a random access response (RAR) after receiving a random access preamble sequence sent by the MTC UE;

wherein the downlink control channel is an enhanced physical downlink control channel (ePDCCH); or, the information carried in a physical broadcast channel (PBCH) indicates that the downlink control channel is the ePDCCH or a physical downlink control channel; or, when the Long Term Evolution (LTE) system bandwidth is less than or equal to the reception bandwidth of the MTC UE, the downlink control channel is a physical downlink control channel, when the LTE system bandwidth is greater than the reception bandwidth of the MTC UE, the downlink control channel is the ePDCCH.

Wherein, the position of the time domain orthogonal frequency division multiplexing (OFDM) symbol of the ePDCCH in the subframe is a fixed position; the position of PDSCH is indicated by the ePDCCH in a present frame or across frames.

Preferably, the sending module 101 is further configured to, after receiving the same random access preamble sequence sent by a plurality of MTC UEs, return a contention resolution message to the MTC UE accessing successfully through the PDSCH indicated by the downlink control channel.

In addition, the eNodeB further comprises: a configuring module 103, which is configured to configure the PRACH resources for the MTC UE, and send the PRACH resources to the sending module.

Preferably, the configuring module 103 is configured to: configure dedicated PRACH resources for the MTC UE, wherein the dedicated PRACH resources comprise frequency-domain resources, time-domain resources and preamble sequence resources; configure parts of the PRACH resources used by the ordinary legacy R8/9/10 user equipment (OL UE) for the MTC UE; or, configure all of the PRACH resources used by the OL UE for the MTC UE.

Preferably, the sending module 101 is configured to:

if the PRACH resources are dedicated PRACH resources configured for the MTC UE, after receiving the random access preamble sequence on the PRACH resources, only send the ePDCCH scrambled with the random access Radio Network Temporary Identifier (RA-RNTI);

if the PRACH resource is a part of the PRACH resources used by the OL UE and configured for the MTC UE, after receiving the random access preamble sequence on the PRACH resources, when the random access preamble sequence is shared by the MTC UE and the OL UE, send the ePDCCH scrambled with the RA-RNTI and the PDCCH scrambled with the RA-RNTI, and when the random access preamble sequence is exclusively used by the OL UE, send the PDCCH scrambled with the RA-RNTI;

if the PRACH resources are all of the PRACH resources used by the OL UE and configured for the MTC UE, then after receiving the random access preamble sequence on the PRACH resources, send the ePDCCH scrambled with the RA-RNTI and the PDCCH scrambled with the RA-RNTI.

The abovementioned eNodeB sends the PRACH resources to the MTC UE through the PDSCH indicated by the downlink control channel, and provides conditions for the MTC UE accessing the LTE system, and its implementation process can refer to FIG. 5 and is not repeated here.

Figure 11:
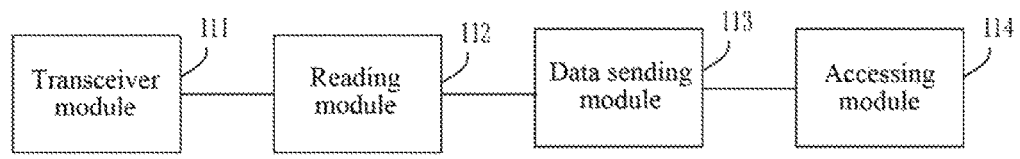
FIG. 11 is a structural diagram of a MTC UE embodiment in accordance with the present invention.

FIG. 11 is the structural diagram of a MTC UE embodiment of the present invention, and the UE comprises a transceiver module 111, a reading module 112 and a data sending module 113, wherein:

the transceiver module 111 is configured to receive physical random access channel (PRACH) resource configuration information sent by the eNodeB via a physical downlink shared channel (PDSCH) indicated by a downlink control channel, and send a random access preamble sequence to the eNodeB on the PRACH resources indicated by the PRACH resource configuration information;

the reading module 112 is configured to use a random access radio network temporary identifier (RA-RNTI) to monitor the downlink control channel, and read information carried in the random access response (RAR) sent by the eNodeB from the PDSCH indicated in the monitored downlink control channel;

the data sending module 113 is configured to send uplink data to the eNodeB through a physical uplink share channel (PUSCH) according to the information carried in the RAR;

wherein, the downlink control channel is an enhanced physical downlink control channel (ePDCCH); or, after the MTC UE receives a physical broadcast channel (PBCH), information carried by the PBCH is used to determine that the downlink control channel is the ePDCCH or a physical downlink control channel; alternatively, the MTC UE obtains the system bandwidth, when the long-term evolution (LTE) system bandwidth is less than or equal to the reception bandwidth of the MTC UE, the downlink control channel is a physical downlink control channel, and when the LTE system bandwidth is greater than the reception bandwidth of the MTC UE, the downlink control channel is the ePDCCH.

In addition, the user equipment may further comprise: an accessing module 114, which is configured to use a temporary cell radio network temporary identifier (C-RNTI) to monitor the downlink control channel, read out a contention resolution message from the PDSCH indicated in the monitored downlink control channel, judge whether the random access of the MTC UE is successful or not according to the contention resolution message, and upgrade the temporary C-RNTI to a C-RNTI if the access is successful.

The abovementioned MTC UE obtains the relevant information from the PDSCH position indicated on the downlink control channel by monitoring the downlink control channel to complete the access process, and the specific process can refer to FIG. 5 and FIG. 6 and is not repeated herein.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

The above embodiments are merely provided for describing rather than limiting the technical schemes of the patent document, and the patent document just has been described in detail with reference to the preferred embodiments. A person skilled in the art should understand that, modifications or equivalent replacements can be made for the technical scheme of the patent document, and without departing from the spirit and scope of the patent document, these modifications or equivalent replacements shall be covered in the scope of the claims of the patent document.

INDUSTRIAL APPLICABILITY

The abovementioned information processing method, the method for a machine-to-machine user equipment randomly accessing the LTE system, the evolved NodeB and the machine-to-machine user equipment solve the problem of a bandwidth-limited MTC user equipment randomly accessing the LTE system, especially the problems of PRACH resource allocation and frequency-domain reception position of a RAR response; in addition, it greatly reduces the cost of the LTE based MTC UE without affecting the performance of the LTE system, and promotes the MTC service evolving from the GSM system to the LTE system.

What is claimed is:

1. An information processing method, wherein the method comprises:
dividing preamble sequences in a access cell into two parts, wherein a first part of the preamble sequences is dedicated preamble codes selected for access of a first type of user equipment (UE), and a second part of the preamble sequences are preamble codes selected for access of a second type of UE;
an evolved nodeB (eNodeB) sending information of a physical random access channel (PRACH) resource configured for a UE to the UE through a physical downlink shared channel (PDSCH) indicated by a downlink control channel;
the eNodeB receiving a preamble sequence which is sent by the UE and selected in the first part of the preamble sequences by the UE;

according to the preamble sequence, the eNodeB distinguishing a type of the UE sending the preamble sequence:
wherein the downlink control channel is an enhanced physical downlink control channel (ePDCCH); or information carried in a physical broadcast channel (PBCH) indicates that the downlink control channel is the ePDCCH or a physical downlink control channel; or, when a Long Term Evolution (LTE) system bandwidth is less than or equal to a reception bandwidth of the UE, the downlink control channel is a physical downlink control channel, when the LTE system bandwidth is greater than the reception bandwidth of the UE, the downlink control channel is the ePDCCH.

2. The method of claim 1, wherein the method further comprises:
after receiving the same random access preamble sequence sent by a plurality of the UEs, the eNodeB returning a contention resolution message to a UE accessing successfully through the PDSCH indicated by the downlink control channel.

3. The method of claim 1, wherein:
the position of a time domain orthogonal frequency division multiplexing (OFDM) symbol of the ePDCCH in a subframe is a fixed position.

4. The method of claim 1, wherein:
before the eNodeB sends PRACH resources configured for a UE to the UE, the method further comprises:
the eNodeB configuring the PRACH resources for the UE.

5. The method of claim 4, wherein:
when the downlink control channel is the ePDCCH, the eNodeB configuring the PRACH resources for the UE comprises:
the eNodeB configuring dedicated PRACH resources for the UE, wherein the dedicated PRACH resources comprise frequency-domain resources, time-domain resources and preamble sequence resources;
the eNodeB configuring parts of PRACH resources used by an ordinary legacy R8/9/10 user equipment (OL UE) for the UE; or
the eNodeB configuring all of PRACH resources used by the OL UE for the UE.

6. The method of claim 1, wherein:
the position of the PDSCH is indicated by the ePDCCH in a present frame or across frames.

7. The method of claim 5, wherein:
the eNodeB sends the downlink control information after receiving a random access preamble sequence sent by the UE, comprising:
if the PRACH resources are dedicated PRACH resources configured for the UE, after receiving the random access preamble sequence on the PRACH resources, the eNodeB sending an ePDCCH scrambled with a random access Radio Network Temporary Identifier (RA-RNTI) on a predefined reception bandwidth of the UE;
if the PRACH resources are parts of the PRACH resources used by the OL UE and configured for the UE, after receiving the random access preamble sequence on the PRACH resources, the eNodeB sending the ePDCCH scrambled with the RA-RNTI and a PDCCH scrambled with the RA-RNTI when the random access preamble sequence is shared by the UE and the OL UE, and sending the PDCCH scrambled by the RA-RNTI when the random access preamble sequence is exclusively used by the OL UE;

if the PRACH resources are all of the PRACH resources used by the OL UE and configured for the UE, then after receiving the random access preamble sequence on the PRACH resources, the eNodeB sending the ePDCCH scrambled with the RA-RNTI and the PDCCH scrambled with the RA-RNTI.

8. A method for user equipment randomly accessing a Long Term Evolution (LTE) system, wherein the method comprises:
dividing preamble sequences in a access cell into two parts, wherein a first part of the preamble sequences is dedicated preamble codes selected for access of a first type of user equipment (UE), and a second part of the preamble sequences are preamble codes selected for access of a second type of UE;
the UE receiving Physical random access channel (PRACH) resource configuration information sent by an evolved nodeB (eNodeB) through a physical downlink shared channel (PDSCH) indicated by a downlink control channel;
after receiving the PRACH resource, the UE selecting a preamble sequence in the first part of the preamble sequences, and transmitting the preamble sequence to the eNodeB on the PRACH resources indicated by the PRACH resource configuration information;
wherein according to the received preamble sequence the eNodeB distinguishes a type of the UE sending the preamble sequence:
the UE using a random access radio network temporary identifier (RA-RNTI) to monitor the downlink control channel, reading information carried in a random access response (RAR) sent by the eNodeB from a PDSCH indicated by the monitored downlink control channel;
the UE sending uplink data to the eNodeB through a physical uplink shared channel (PUSCH) according to the information carried in the RAR;
wherein the downlink control channel is an enhanced physical downlink control channel (ePDCCH); or, after the UE receives a physical broadcast channel (PBCH), information carried by the PBCH is used to determine that the downlink control channel is the ePDCCH or a physical downlink control channel; alternatively, the UE obtains a system bandwidth, when the long-term evolution (LTE) system bandwidth is less than or equal to a reception bandwidth of the UE, the downlink control channel is a physical downlink control channel, when the LTE system bandwidth is greater than the reception bandwidth of the UE, the downlink control channel is the ePDCCH.

9. The method of claim 8, wherein:
after the UE sends the uplink data to the eNodeB through the PUSCH, the method further comprises:
the UE taking a temporary cell radio network temporary identifier (C-RNTI) to monitor the downlink control channel, reading a contention resolution message from the PDSCH indicated by the monitored downlink control channel, and judging whether the random access of the UE is successful or not according to the contention resolution message, and upgrading the temporary C-RNTI to a C-RNTI if the access is successful.

10. An evolved NodeB, wherein preamble sequences in a access cell is divided into two parts, wherein a first part of the preamble sequences is dedicated preamble codes selected for access of a first type of user equipment (UE), and a second part of the preamble sequences are preamble codes selected for access of a second type of UE;
wherein the evolved NodeB comprises:
a sending module, which is configured to send physical random access channel (PRACH) resource information configured for a UE to the UE through a physical downlink shared channel (PDSCH) indicated by a downlink control channel; and
a processing module, which is configured to send downlink control information and a random access response (RAR) after receiving a random access preamble sequence sent by the UE, receive a preamble sequence which is sent by the UE and selected in the first part of the preamble sequences by the UE, and according to the preamble sequence, distinguish a type of the UE sending the preamble sequence;
wherein the downlink control channel is an enhanced physical downlink control channel (ePDCCH); or, information carried in a physical broadcast channel (PBCH) indicates that the downlink control channel is the ePDCCH or a physical downlink control channel; or, when a Long Term Evolution (LTE) system bandwidth is less than or equal to a reception bandwidth of the UE, the downlink control channel is a physical downlink control channel, when the LTE system bandwidth is greater than the reception bandwidth of the UE, the downlink control channel is the ePDCCH.

11. The evolved NodeB of claim 10, wherein:
the sending module is further configured to, after receiving the same random access preamble sequence sent by a plurality of the UEs, return a contention resolution message to a UE accessing successfully through the PDSCH indicated by the downlink control channel.

12. The evolved NodeB of claim 10, wherein the evolved NodeB further comprises:
a configuring module, which is configured to configure the PRACH resources for the UE, and send the PRACH resources to the sending module.

13. The evolved NodeB of claim 12, wherein:
the configuring module is configured to:
configure dedicated PRACH resources for the UE, wherein the dedicated PRACH resources comprise frequency-domain resources, time-domain resources and preamble sequence resources;
configure parts of the PRACH resources used by an ordinary legacy R8/9/10 user equipment (OL UE) for the UE; or
configure all of PRACH resources used by the OL UE for the UE.

14. The evolved NodeB of claim 10, wherein:
the position of the PDSCH is indicated by the ePDCCH in a present frame or across frames.

15. The evolved NodeB of claim 13, wherein:
the sending module is configured to:
if the PRACH resources are dedicated PRACH resources configured for the UE, after receiving the random access preamble sequence on the PRACH resources, only send an ePDCCH scrambled with a random access radio network temporary identifier (RA-RNTI);
if the PRACH resources are parts of the PRACH resources used by the OL UE and configured for the UE, after receiving the random access preamble sequence on the PRACH resources, send the ePDCCH scrambled with the RA-RNTI and the PDCCH scrambled with the RA-RNTI when the random access preamble sequence is shared by the UE and the OL UE, and send the PDCCH scrambled with the RA-RNTI when the random access preamble sequence is exclusively used by the OL UE;

if the PRACH resources are all of the PRACH resources used by the OL UE and configured for the UE, then after receiving the random access preamble sequence on the PRACH resources, send the ePDCCH scrambled with the RA-RNTI and the PDCCH scrambled with the RA-RNTI.

16. A user equipment, wherein preamble sequences in a access cell is divided into two parts, wherein a first part of the preamble sequences is dedicated preamble codes selected for access of a first type of user equipment (UE), and a second part of the preamble sequences are preamble codes selected for access of a second type of UE;

wherein the user equipment comprises:
a transceiver module, which is configured to receive physical random access channel (PRACH) resource configuration information sent by an eNodeB via a physical downlink shared channel (PDSCH) indicated by a downlink control channel, and after receiving the PRACH resource, select a preamble sequence in the first part of the preamble sequences, and transmit the preamble sequence to the eNodeB on the PRACH resources indicated by the PRACH resource configuration information; wherein according to the received preamble sequence the eNodeB distinguishes a type of the UE sending the preamble sequence;
a reading module, which is configured to use a random access radio network temporary identifier (RA-RNTI) to monitor the downlink control channel, and read information carried in a random access response (RAR) sent by the eNodeB from a PDSCH indicated in the monitored downlink control channel; and
a data sending module, which is configured to send uplink data to the eNodeB through a physical uplink shared channel (PUSCH) according to the information carried in the RAR;
wherein the downlink control channel is an enhanced physical downlink control channel (ePDCCH); or, after receiving a physical broadcast channel (PBCH), the UE determines that the downlink control channel is the ePDCCH or a physical downlink control channel through information carried by the PBCH; alternatively, the UE obtains a system bandwidth, when a long-term evolution (LTE) system bandwidth is less than or equal to a reception bandwidth of the UE, the downlink control channel is a physical downlink control channel, and when the LTE system bandwidth is greater than the reception bandwidth of the UE, the downlink control channel is the ePDCCH.

17. The user equipment of claim 16, wherein the user equipment further comprises:
an accessing module, which is configured to use a temporary cell radio network temporary identifier (C-RNTI) to monitor the downlink control channel, read a contention resolution message from the PDSCH indicated in the monitored downlink control channel, and judge whether the random access of the UE is successful or not according to the contention resolution message, and upgrade the temporary C-RNTI to a C-RNTI if the access is successful.

18. The method of claim 2, wherein:
the position of a time domain orthogonal frequency division multiplexing (OFDM) symbol of the ePDCCH in a subframe is a fixed position.

19. The method of claim 2, wherein:
before the eNodeB sends PRACH resources configured for a UE to the UE, the method further comprises:
the eNodeB configuring the PRACH resources for the UE.

20. The method of claim 19, wherein:
when the downlink control channel is the ePDCCH, the eNodeB configuring the PRACH resources for the UE comprises:
the eNodeB configuring dedicated PRACH resources for the UE, wherein the dedicated PRACH resources comprise frequency-domain resources, time-domain resources and preamble sequence resources;
the eNodeB configuring parts of PRACH resources used by an ordinary legacy R8/9/10 user equipment (OL UE) for the UE; or
the eNodeB configuring all of PRACH resources used by the OL UE for the UE.

* * * * *